(12) United States Patent
Ahern et al.

(10) Patent No.: US 7,849,496 B2
(45) Date of Patent: Dec. 7, 2010

(54) PROVIDING ENTERPRISE MANAGEMENT OF AMORPHOUS COMMUNITIES

(75) Inventors: Michael I. Ahern, Brighton, MA (US); Jacqueline M. Ferguson, Manchester, NH (US); Alexander Kordun, Arlington, MA (US); Joseph A. Russo, Westford, MA (US); Ajamu Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/617,305

(22) Filed: Dec. 28, 2006

(65) Prior Publication Data

US 2008/0162482 A1 Jul. 3, 2008

(51) Int. Cl.
*G06F 17/00* (2006.01)
*G06F 17/30* (2006.01)

(52) U.S. Cl. .................................... 726/1; 726/6; 726/4
(58) Field of Classification Search ...................... 726/1, 726/6, 4
See application file for complete search history.

(56) References Cited

U.S. PATENT DOCUMENTS 7,184,970 B1 * 2/2007 Squillante ................ 705/14.27

2003/0131232 A1 * 7/2003 Fraser
2006/0048059 A1 * 3/2006 Etkin
2007/0130164 A1 * 6/2007 Kembel
2008/0010266 A1 * 1/2008 Brunn

OTHER PUBLICATIONS

An Efficient Scheme to Construct Virtual Community for Multimedia Content Sharing Based on Profile in a Ubiquitous Computing Environment ; Chung-Pyo Hong; Eo-Hyung Lee; Shin-Dug Kim; Inc, IMS and IDC, 2009. NCM '09. Fifth International Joint Conference on; Publication Year: 2009 , pp. 1271-1276.*

* cited by examiner

*Primary Examiner*—David Y Jung
(74) *Attorney, Agent, or Firm*—Cuenot, Forsythe & Kim, LLC

(57) ABSTRACT

A method of managing online communities within an online community management system can include declaratively specifying a taxonomy of online community types, declaratively specifying a plurality of roles for members of online communities, and declaratively specifying a security policy that associates permissions with roles and online community types. A plurality of online community profiles can be maintained. Each online community profile can represent an online community, specify an online community type from the taxonomy, and specify a list of members of that online community as well as an associated role for each member. Access can be provided to a selected online community according to the online community type of the selected online community, a role within the selected online community that is associated with a user attempting to access the selected online community, and the security policy.

20 Claims, 5 Drawing Sheets

300

```
...
<commgr:communityTaxonomy>
<commgr:communityType name="Public" visibility="public"/>
<commgr:communityType name="Private" visibility="private"/>
<commgr:communityType name="PublicInvite" visibility="public"/>
<communityType name="PublicModerated" visibility="public"/>
</commgr:communityTaxonomy>
...
```

```
...
<commgr:communityRoles>
<commgr:communityRole name="creator"/>
<commgr:communityRole name="owner"/>
<commgr:communityRole name="member"/>
<commgr:communityRole name="invitee"
scope="PublicInvite"/>
<commgr:communityRole name="allAuthenticated"/>
<commgr:communityRole name="everyone"/>
</commgr:communityRoles>
...
```

FIG. 4

500 grant Principal com.ibm.lotus.principal.role "creator" {
permission com.ibm.lotus.CommunityManagementPermission "public", "delete";
permission com.ibm.lotus.CommunityManagementPermission "publicInvite", "delete";
permission com.ibm.lotus.CommunityManagementPermission "private", "delete";
};
grant Principal com.ibm.lotus.principal.role "owner" {
permission com.ibm.lotus.CommunityManagementPermission "public", "edit";
permission com.ibm.lotus.CommunityManagementPermission "publicInvite", "edit";
permission com.ibm.lotus.CommunityManagementPermission "private", "edit";

permission com.ibm.lotus.CommunityAccessPermission "public", "active";
permission com.ibm.lotus.CommunityAccessPermission "publicInvite", "active";
permission com.ibm.lotus.CommunityAccessPermission "private", "active";

permission com.ibm.lotus.CommunityMembershipPermission "public", "add.others",
    "remove.others" , "define.roles";
permission com.ibm.lotus.CommunityMembershipPermission "publicInvite",
    "add.others", "remove.others" , "define.roles", "extend.invite";
permission com.ibm.lotus.CommunityMembershipPermission "private", "add.others",
    "remove.others" , "define.roles";
};

grant Principal com.ibm.lotus.principal.role "member" {
permission com.ibm.lotus.CommunityAccessPermission "private", "passive";
};

grant Principal com.ibm.lotus.principal.role "invitee" {
permission com.ibm.lotus.CommunityMembershipPermission "publicInvite", "add.self", "remove.self";
};

grant Principal com.ibm.lotus.principal.role "allAuthenticated" {
permission com.ibm.lotus.CommunityManagementPermission "public", "create";
permission com.ibm.lotus.CommunityManagementPermission "publicInvite", "create";
permission com.ibm.lotus.CommunityManagementPermission "private", "create";

permission com.ibm.lotus.CommunityMembershipPermission "public", "add.self","remove.self";
};

grant Principal com.ibm.lotus.principal.role "everyone" {
permission com.ibm.lotus.CommunityAccessPermission "public", "passive";
permission com.ibm.lotus.CommunityAccessPermission "publicInvite", "passive";
};

FIG. 5

600 com.ibm.lotus.CommunityManagementPermission [public, publicInvite, private] (create,edit,delete)
com.ibm.lotus.CommunityAccessPermission [public, publicInvite, private] (passive,active)
com.ibm.lotus.CommunityMembershipPermission [public, publicInvite, private]
        (add.self,add.others,remove.self,remove.others,define.roles,extend.invite)
com.ibm.lotus.AllPermission

FIG. 6

PROVIDING ENTERPRISE MANAGEMENT OF AMORPHOUS COMMUNITIES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

As the Internet continues to evolve, the phrase "online community" has come to refer to a variety of different groups. In a broad sense, an online, or virtual, community refers to a group whose members are connected by means of one or more information technologies that operate over a communication network, whether the Internet, a local area network, a wide area network, etc. Members of an online community are able to carry on some form of discourse over the network. Examples of online communities can include, but are not limited to, discussion forums, blogs, social networks, and the like.

From the description above, one can see that the phrase "online community" encompasses a wide variety of groups. One characteristic often shared among online communities is that the communities tend to be self-service in nature. Users typically learn of an online community and join that community independently of other users. The online communities themselves are created and maintained independently of one another. Often, online communities exercise little control over membership or other features of the communities.

BRIEF SUMMARY OF THE INVENTION

The present invention relates to a method of administering online communities within an online community management system. The method can include declaratively specifying a taxonomy of online community types, declaratively specifying a plurality of roles for members of online communities, and declaratively specifying a security policy that associates permissions with roles and online community types. A plurality of online community profiles can be maintained. Each online community profile can represent an online community, specify an online community type from the taxonomy, and specify a list of members of that online community and an associated role for each member. Access can be provided to a selected online community according to the online community type of the selected online community, a role within the selected online community that is associated with a user attempting to access the selected online community, and the security policy.

The present invention also relates to an online community management system. The system can include a first tier providing a user interface through which users can access online communities maintained by the online community management system and an authentication module that can authenticate users of the online communities maintained by the online community management system. A second tier can be included that provides a service layer retrieving data and performing actions requested through the first tier and an authorization module verifying member permissions with respect to online communities with which the members are associated. A third tier can be provided that includes a directory access module accessing directory services external to the online community management system and a database that includes a plurality of online community profiles. Each online community profile can specify members of the online community represented by that online community profile and a role for each member of that online community.

Yet another embodiment of the present invention can include a computer program product including a computer-usable medium having computer-usable code that, when executed, causes a machine to perform the various steps and/or functions described herein.

BRIEF DESCRIPTION OF THE SEVERAL VIEWS OF THE DRAWINGS

FIG. 3 is an excerpted portion of markup language illustrating an online community taxonomy in accordance with another aspect of the present invention.

FIG. 4 is an excerpted portion of markup language illustrating roles that can be assigned to community members in accordance with another aspect of the present invention.

FIG. 5 is an excerpted portion of markup language illustrating a security policy in accordance with another aspect of the present invention.

FIG. 6 is an excerpted portion of markup language illustrating a permission set in accordance with another aspect of the present invention.

DETAILED DESCRIPTION OF THE INVENTION

Figure 1:
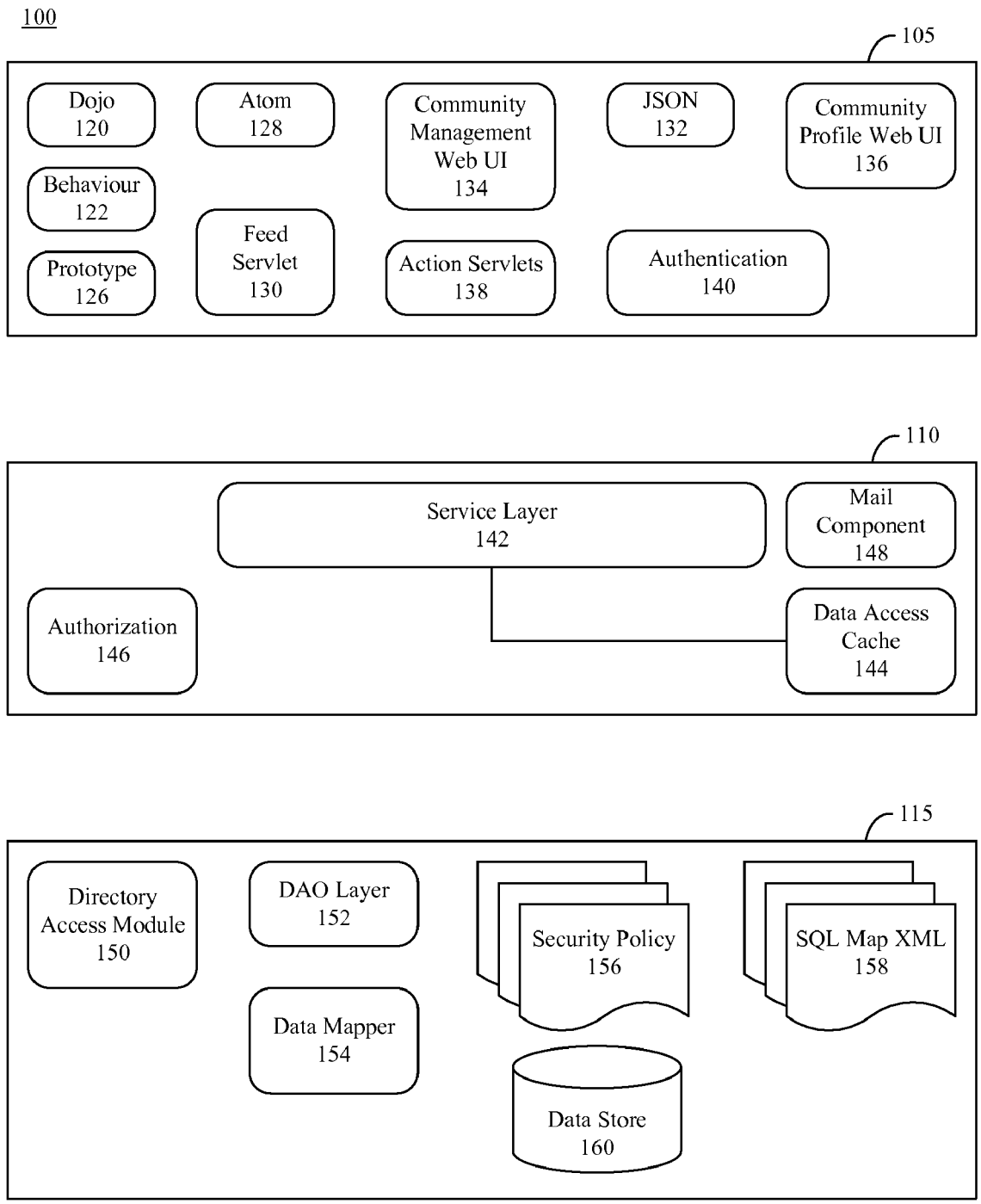
FIG. 1 is a block diagram illustrating a system in accordance with one aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to online communities and, more particularly, to centrally managing and administering one or more online communities. Online communities can be defined using a relational representation of a directory access protocol. The base representation of an online community can be stored within a relational database to facilitate replication and synchronization with a directory management system. The embodiments disclosed herein can be used within an enterprise computing environment where security is needed.

FIG. 1 is a block diagram illustrating a community management system 100 in accordance with one aspect of the present invention. The community management system 100 can include three separate tiers or levels. More particularly, the community management system 100 can include a "Web Tier" 105, a business logic tier 110, and a resource tier 115. The Web tier 105 can include various technologies that support Web-based user interface(s) to the community management system 100. The Web tier 105 can include several libraries that provide components for constructing Web-based user interfaces such as the Dojo Javascript Library 120, the Behaviour Javascript Library 122, as well as the Prototype Javascript library 126.

The Web tier 105 further can include support for publishing content and updating content. For example, an ATOM module 128 can be included that supports Atom Syndication Format and Atom Publishing Protocol. Atom Syndication Format refers to an Extensible Markup Language (XML) used for providing Web feeds. Atom Publishing Protocol refers to an HTTP-based protocol for creating and updating Web resources. A servlet 130 for parsing ATOM feeds can be included. For example, in one embodiment, the servlet 130 can be implemented as the Abdera Servlet library. A JSON module 132 can be included which provides a text formatted, language independent mechanism for exchanging data.

A community management Web user interface (UI) 134 can be included as well as a community profile Web UI 136. The community management Web UI 134 provides a mechanism through which users can search and view the online communities that have been created and which are maintained by the community management system 100. Through the community management Web UI 134 a user further can select a particular online community. Once selected, the community profile Web UI 136 allows users to perform functions such as viewing a profile for the selected online community, join the selected online community, see a list of members for the selected online community, as well as view other resources for the selected online community.

The action servlets 138 are a collection of servlets configured to perform various actions relating to online community management. In one embodiment, the action servlets 138 can be implemented using "Struts" technology. "Struts" refers to a control layer framework that supports the Model-View-Controller (MVC) architecture for interactive applications. For example, the various functions described with reference to the community management Web UI 134 and the community profile Web UI 136 can be implemented by one or more action servlets 138. Other functions that can be performed by an action servlet 138 can include, but are not limited to, adding a member to a community, removing a member from a community, and the like.

The authentication module 140 can establish the identity of a user when that user attempts to access the community management system 100 or an online community managed by the community management system 100. In one embodiment, the authentication module 140 can be implemented using Java Authentication and Authorization Service (JAAS). JAAS refers to a set of application programming interfaces (APIs) that effectively allows a set of configuration files to be used to determine whether a particular user requires authentication when interacting with the community management system 100.

The authentication module 140 further allows impersonation of authenticated subjects. Accordingly, various functions, for example, within the service layer 142, within the community management system 100 can impersonate a logged-in member of an online community to perform a function in the name of the user or to delegate the identity of the user when communicating with remote servers. Privileges can be granted to the identity of the user. By leveraging JAAS authentication, for example, authenticated subjects may be impersonated via a method such as "javax.jaas.subject.doAs( )" where the security context for each principal associated with the subject is in scope during permission checks. The community management system 100 can bind principals to the associated subject relative to role definitions maintained in the community data store 160. This process can be referred to as "community scoped impersonation".

The business logic tier 110 can include a service layer 142. The service layer 142 can perform data retrieval functions that can be initiated through or by the Web tier 105. The service layer 142 can retrieve data from one or more other data stores (not shown), as well as data store 160 within the resource tier 115. The business logic tier 110 further can include a data access cache 144 in which data that has been retrieved can be temporarily stored. The service layer 142 further can provide one or more RESTful APIs that expose community management functions and allow third party applications, such as blogs, list serves, instant messaging, and the like, to offer services to community members.

The community management system 100 provides a loosely coupled system where community members that have been granted "active" access to a community, as defined by a security policy, can bookmark links and tag the bookmarks. Accordingly, any URL addressable resource, e.g., a discussion forum, can be associated with an online community in this manner. Since the community management and introspection features provide by the community management system 100 can be exposed via ATOM feeds, such external resources and/or services can be regulated or integrated, for example, in terms of access, with the community to which the resource has been associated by synchronizing membership of the online community via the online community management system 100, etc. That is, external resources can synchronize their membership with the membership of the online community with which that resource is associated as specified within the community management system 100 through the Web tier 105.

As known, REST stands for Representational State Transfer and refers to an architecture for networked systems. A RESTful API refers to an API that, in general, follows a client-server pull-based interaction style wherein each request from a client specifies all information necessary to understand the request. Further, any resources provided can be accessed via a generic interface, e.g., HTTP GET, POST, PUT, DELETE. Resources provided via a RESTful API can be named using a URL.

The authorization module 146 can determine whether a given user is permitted to perform one or more actions within the community management system 100 in relation to a given online community. For example, the authorization module 146 can determine whether a given user is permitted to create a community, join a community, or perform any of the other actions discussed with reference to the Web tier 105, for example. In one embodiment, the authorization module 146 can be implemented using JAAS authorization. For example, a JAAS authorization module can ensure that users have the access control rights or permissions required to initiate requested actions for a specified online community.

In one aspect, the business logic tier 110 can include a mail component 148 which facilitates interaction between the community management system 100 and one or more electronic mail systems. Through the mail component 148, the community management system 100 can cause electronic mail notifications to be sent or the like. In one embodiment, the mail component 148 can be implemented as a Java-based electronic mail interface. Other interfaces to messaging systems, e.g., instant messaging systems, can be included as well for purposes of initiating notifications.

The resources tier 115 can include a directory access module 150, a data access objects (DAO) layer 152, a data mapper 154, a security policy 156, an SQL Map XML module 158, as well as a data store 160. The directory access module 150 provides a layer of abstraction for accessing various directory services that may exist within an enterprise computing environment, but external to the community management system 100. In general, the various services within the community management system 100 need only communicate with the directory access module 150, which then communicates with the external directory services to obtain user profile information or any other information that may be maintained within a directory service conforming to Lightweight Directory Access Protocol or another such protocol.

In one embodiment, the directory access module 150 can include a Java Naming and Directory Interface (JNDI) component which provides a standard extension to the Java platform. Accordingly, the directory access module 150 can provide Java-enabled applications with a unified interface to one or more naming and directory services. Thus, the services layer 142, for example, can access the directory access module 150 to initiate a query to one or more external data sources to obtain needed information.

The DAO layer 152 provides a set of objects that can abstract functions relating to accessing the data store 160. In one embodiment, the data store 160 can be implemented as a relational database. The data store 160 can store the various items of information noted herein, e.g., profiles for online communities, members of the online communities, and the like. The data mapper 154 specifies the queries for accessing the data store 160. In one embodiment, the data mapper 154 can be implemented as an iBATIS data mapper, which allows queries for the data store 160 to be specified in a declarative manner through XML.

The security policy 156 provides the roles, permissions, and any other attributes that are accessed by the authentication module 140 and/or the authorization module 146 in authenticating a user or determining permissions granted to the user as a member of an online community. To change the rights associated with a given user one need only change the parameters specified within the security policy. The SQL Map XML module 158 specifies the XML files that define the XML statements. The SQL Map XML module 158 can be implemented as a configuration file associated with the data mapper 154. In the case where the data mapper 154 is implemented as the iBATIS data mapper, the SQL Map XML module can be a declarative XML Object Relational Mapping utility. The SQL Map XML module 154 correlates SQL queries with Java DAO interfaces, e.g., the DAO layer 152. Though depicted separately, the security policy 156 and the SQL map XML module 158 can be stored within the data store 160.

When a user logs into the community management system 100, the service layer 142, via the directory access module 150, can obtain information from a profile for the user that is located within an external directory service. The directory service, for example, can be an LDAP directory for a given organization and may include organizational information. Once such information is first retrieved, the information can be stored within the data store 160 for future use.

After the first access by the user, the community management system 100 can maintain a local record for the user to relieve congestion on heavily used resources such as a corporate LDAP directory. Information such as user names, a list of users within a given online community, attributes of the community, as well as a list of various resources that have been associated with the online communities can be stored within the data store 160. In another aspect, the data retrieval can be performed when no data for the user exists within the data store 160, periodically or from time-to-time to update the user data within the data store 160, or the like.

Resources generally are associated with online communities by adding a reference to that resource within a profile of the online community maintained within the data store 160. While larger resources such as discussion forums, blogs, etc., are not maintained within the community management system 100, lighter resources such as community bookmarks can be stored within the profile of an online community. In the case of larger resources, a reference to the resource, i.e., a URI or URL, can be stored. As noted, the resource can be provided access to the community management system 100 via RESTful APIs provided in the service layer 142. Such APIs allow the resource to exchange information with the online community with which the resource is associated, e.g., to synchronize memberships or allow users of a discussion forum to add further resources to the online community through the discussion forum.

Resources that can be associated with online communities can be created and managed completely externally from the online community with which the resource(s) are associated as well as the community management system 100 itself. The resources may be resources that existed before the community was created, for example. The community management system 100 REST APIs allow membership synchronization between resources of an online community and the online community. The online community, however, does not manage the access control of that resource. As such, there is a flexible, loose coupling in which the external resource does not need to be a "composite" resource of the community as are community bookmarks, for example.

In further embodiments, the visibility of the resource can be hidden from members outside of the community or the resource can be secured such that only members of the community can have access to certain actions. Such implementation details, however, can be left up to the resource and need not be declared as part of the community management implementation.

By leveraging Java 2 Security, the containers support for configuring the application server user registry along with support for Trust Association Interceptors, Java Authorization Contract for Containers (Java ACC), and third party authorization and authentication provide enterprise system level roles that can be mapped to principals which are bound to an authenticating JAAS subject. Further, JAAS allows for multiple policy files to be in scope, where a policy file may be defined which associates system level roles with community specific permissions. In this manner, administrative groups and roles with specific access control directives and business policies may be applied to community actors.

Authorization policies are statically defined within standard Java 2 security specifications supported by Web Application Servers and Java based security implementations. This allows permission domains to be defined where specific entitlements can be granted to a principal (i.e. an identifiable entity). A policy file can be specified which defines a set of permission domains based upon roles, where the role is the principal. Since policies are defined statically and typically only loaded when an application is initialized, a clear specification for associating dynamic resources to a security context is lacking. For example, while it may be known that a user has authenticated with the community management service 100, policy that specifies the permissions one has in accessing a specific online community instance is lacking. Since the community instance is created dynamically, there is no way to specify a policy with community instance granularity.

Accordingly, security policies can be defined according to community type rather than community instance. As will be shown with reference to the security policy of FIG. 5, subjects and entities that access the community management system 100, have been authenticated, and have the community "owner" role can be allowed to edit or delete public or private communities. A user may be an owner of one community, but only a member of another community. Thus, the community management system 100 maps these application roles to specific community instances.

The mapping can be performed by first authenticating the subject and, once the subject accesses a privileged action relative to a community instance, the role of the user within that online community can be determined from the underlying relational data model. The appropriate role principle, e.g., owner, member, etc., can be added to the subject token, i.e., the JAAS subject. This adds the principal to the security context of the user and thus the permissions associated with that role also can be associated with that subject. By invoking the "doAs" command in the JAAS framework, the community management system 100 can invoke the security context of the referenced user.

The "doAs" command can associate the specified subject with the AccessControlContext of the current thread, and execute the action. This achieves the effect of having the action run as the subject. The community management system 100 acts on behalf of the user and has the permissions associated with the security context of that user. Once the privileged action is complete the principal is removed from the JAAS subject such that the associated permissions are revoked. This ability to dynamically build and tailor security context based on application specific roles and community access permissions, as noted, can be referred to as "community scoped impersonation".

Figure 2:
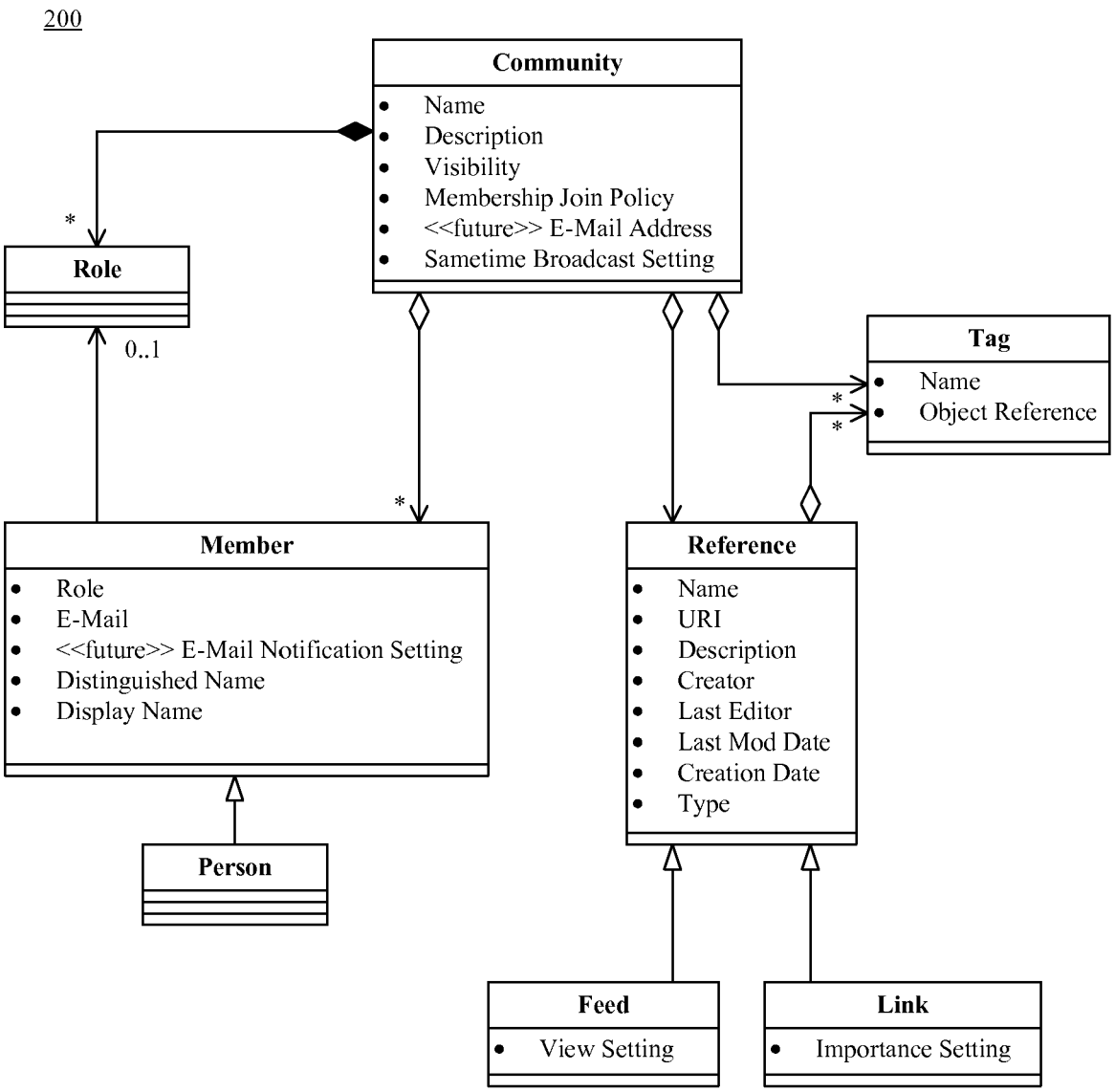
FIG. 2 is a class diagram which is useful for understanding another aspect of the present invention.

FIG. 2 is a class diagram 200 which is useful for understanding another aspect of the present invention. The class diagram 200 illustrates one manner in which the online communities can be represented. As shown, the online communities can be represented as a relational directory, e.g., a relational version of an X.500 directory, which can be stored within the resources tier of the community management system. The class structure illustrates that users can maintain profiles which can be associated with one or more online community profiles. Online community profiles allow URL addressable resources to be associated with the community membership. The members of the online community can be tagged in a manner that reflects the interests of that member, and thus, the interests of the communities to which that user may be associated.

FIG. 3 is an excerpted portion of markup language 300 illustrating an online community taxonomy in accordance with another aspect of the present invention. The online community taxonomy can be maintained within the community management system as described with reference to FIG. 1. The excerpt 300 depicts the various types of online communities that can be defined in a declarative manner through an administrative console (not shown).

The different online community types can include, but are not limited to, Public, Private, PublicInvite, and PublicModerated. When an online community is created, the type can be assigned or designated within the profile of the online community. The type indicates a set of characteristics that are applied to the online community such as whether any one can join (public), whether only selected individuals can join (private), whether one must be invited from a member of the online community to join (public invite), or whether the online community will be moderated. To maintain the integrity of online communities, a community type may not be removed if one or more communities of that type are maintained in community management system. Otherwise, community types can be added, updated, or removed from the community management system, for example, by an administrator through an administrative console.

FIG. 4 is an excerpted portion of markup language 400 illustrating available roles that can be assigned to members of online communities in accordance with another aspect of the present invention. Roles, like community types, can be assigned in a declarative manner via an administrative console. To maintain referential integrity of online communities, a community role may not be removed if communities of the associated scope are referencing roles of that type within the data store. Otherwise, roles can be added, updated, or removed from the community management system by an administrator.

FIG. 5 is an excerpted portion of markup language 500 illustrating a security policy in accordance with another aspect of the present invention. The security policy provides a declarative policy grammar for expressing permission domains. The excerpt 500, for example, can be taken from a JAAS security policy file. As shown, the roles are associated with particular community types and actions (permissions). In general, the lines beginning with "permission" specify an online community type followed by a permission. In illustration, excerpt 500 indicates that the "creator" role has delete permission for public type online communities. Similarly, a creator has delete permission with respect to public invite type online communities and private type online communities.

It should be appreciated that since the various roles, permissions, and online community types can be declared, further roles, permissions, and online community types can be added as may be needed or required. An administrator, for example, can make such additions or changes through an administrative console interface to the community management system which facilitates creation, deletion, and editing of roles, permissions, and online community types as described herein.

In one aspect, multiple security policy files can be specified. The JAAS standard, for example, can support such functionality. Accordingly, while the community management system can include a default security policy file that maps application level roles, e.g., community owner, community member, etc., to application level permissions, e.g., community access permission, community management permission, community membership permission, etc., a system administrator can specify one or more policy files beyond the default policy file. In this manner, the administrator can utilize principal mapping services available in Web application servers via services such as Java Authorization Contract for Containers to associate system roles defined with an enterprise authorization provider such as IBM® Tivoli® Access Manager, available from International Business Machines Corporation of Armonk, N.Y., to application level permissions. For example, a given corporate environment, users that have an associated role within that enterprise may be given access to public communities but not access to private communities. (IBM and Tivoli are trademarks of International Business Machines Corporation in the United States, other countries, or both).

FIG. 6 is an excerpted portion of markup language 600 illustrating a permission set in accordance with another aspect of the present invention. The excerpt 600 illustrates privileged actions relative to a given online community.

It should be appreciated that while reference has been made within this specification to specific products and technologies, such products and technologies have been cited for purposes of example and illustration only in an effort to aid one skilled in the art to better understand the present invention. The embodiments disclosed herein are not intended to be limited solely to such products and/or technologies. Those skilled in the art will recognize that related and/or equivalent products and/or technologies can be used in lieu of those noted or in combination with those noted without limitation to the extent possible.

The block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. Within a system comprising a processor and a memory, a method of administering online communities within an online community management system comprising:
    declaratively specifying, via the processor, a taxonomy of online community types;
    declaratively specifying, via the processor, a plurality of roles for members of online communities;
    declaratively specifying, via the processor, a security policy that associates permissions with roles and online community types;
    maintaining, via the processor, a plurality of online community profiles, wherein each online community profile represents an online community, specifies an online community type from the taxonomy, and specifies a list of members of the online community and an associated role for each member; and
    providing, via the processor, access to a selected online community according to the online community type of the selected online community, a role within the selected online community associated with a user attempting to access the selected online community, and the security policy.

2. The method of claim 1, further comprising linking, via the processor, a permission of a selected online community with a role defined by a system that is external to the selected online community.

3. The method of claim 1, further comprising:
    obtaining, via the processor, data for a member of an online community from a directory service external to the online community management system; and
    storing, via the processor, at least a portion of the data within the online community management system for future reference.

4. The method of claim 1, further comprising associating, via the processor, a resource that is external to the online community management system with an online community.

5. The method of claim 1, further comprising defining, via the processor, the security policy according to online community types.

6. The method of claim 1, further comprising dynamically adding, via the processor, a role to a security context of a user on a per online community basis according to the role of that user within the online community being accessed by that user.

7. The method of claim 6, further comprising performing, via the processor, an action on behalf of the user using the security context of the user.

8. The method of claim 7, further comprising dynamically removing, via the processor, a role from a security context of a user after completion of the action.

9. A community management system comprising:
    a first tier providing a user interface through which users access online communities maintained by the community management system and an authentication module authenticating users of the online communities maintained by the community management system;
    a second tier comprising a service layer retrieving data and performing actions requested through the first tier and an authorization module verifying member permissions with respect to online communities with which the members are associated; and
    a third tier comprising a directory access module accessing directory services external to the community management system, a database comprising a plurality of online community profiles, wherein each online community profile specifies members of the online community represented by that online community profile and a role for each member for that online community.

10. The online community management system of claim 9, further comprising a taxonomy of online community types, wherein each online community profile specifies an online community type from the taxonomy.

11. The online community management system of claim 10, wherein the third tier further comprises a security policy associating roles with permissions for different ones of the online community types of the taxonomy.

12. The online community management system of claim 9, wherein the third tier further comprises a data object layer and data mapper module abstracting functions that access the database.

13. The online community management system of claim 9, wherein the first tier further comprises a module for syndicating information from at least one of the online communities and a module for receiving updates to at least one of the online communities.

14. The online community management system of claim 9, wherein a permission of a selected online community is linked with a role defined by a system that is external to the selected online community.

15. A computer program product comprising:
    a computer-usable medium having computer-usable program code that manages online communities, said computer program product including:
    computer-usable program code that declaratively specifies a taxonomy of online community types;
    computer-usable program code that declaratively specifies a plurality of roles for members of online communities;
    computer-usable program code that declaratively specifies a security policy that associates permissions with roles and online community types;
    computer-usable program code that maintains a plurality of online community profiles, wherein each online community profile represents an online community, specifies an online community type from the taxonomy, and specifies a list of members of the online community and an associated role for each member; and computer-usable program code that provides access to a selected online community according to the online community type of the selected online community, a role within the selected online community associated with a user attempting to access the selected online community, and the security policy.

16. The computer program product of claim 15, further comprising computer-usable program code that links a permission of a selected online community with a role defined by a system that is external to the selected online community.

17. The computer program product of claim 15, further comprising:

computer-usable program code that obtains data for a member of an online community from a directory service external to an online community management system; and computer-usable program code that stores at least a portion of the data within the online community management system for future reference.

18. The computer program product of claim 15, further comprising computer-usable program code that associates a resource that is external to the online community management system with an online community.

19. The computer program product of claim 15, further comprising computer-usable program code that dynamically adds a role to a security context of a user on a per online community basis according to the role of that user within the online community being accessed by that user.

20. The computer program product of claim 15, further comprising computer-usable program code that dynamically removes a role from a security context of the user.

* * * * *